W. H. MULLINS.
AUTOMOBILE DUST PAN.
APPLICATION FILED JULY 8, 1909.

971,550.

Patented Oct. 4, 1910.
2 SHEETS—SHEET 1.

WITNESSES.

INVENTOR.

W. H. MULLINS.
AUTOMOBILE DUST PAN.
APPLICATION FILED JULY 8, 1909.

971,550.

Patented Oct. 4, 1910.
2 SHEETS—SHEET 2.

WITNESSES.
J. R. Keller
Robert C. Totten

INVENTOR.
William H. Mullins
By Kay & Totten
Attorneys

UNITED STATES PATENT OFFICE.

WILLIAM H. MULLINS, OF SALEM, OHIO.

AUTOMOBILE DUST-PAN.

971,550.　　　Specification of Letters Patent.　　Patented Oct. 4, 1910.

Application filed July 8, 1909.　Serial No. 506,622.

*To all whom it may concern:*

Be it known that I, WILLIAM H. MULLINS, a resident of Salem, in the county of Columbiana and State of Ohio, have invented a new and useful Improvement in Automobile Dust-Pans; and I do hereby declare the following to be a full, clear, and exact description thereof.

My invention relates to dust pans, grease pans, or guards for use in automobiles or like vehicles. Its object is to provide a dust pan which effectively prevents the entrance of dust and dirt to the machinery, is light of construction, and has means for effecting the satisfactory exit of the waste oil, and which is free from rattling and vibration while the vehicle is running.

My invention comprises, generally stated, a pressed dust pan having a plurality of transverse troughed ribs or gutters arranged as set forth below to prevent rattling and aid in the disposal of waste oil. It comprises also, preferably one or more longitudinal troughed ribs or gutters to act in combination with the transverse gutters; and certain other features hereinafter set forth.

Figure 1:
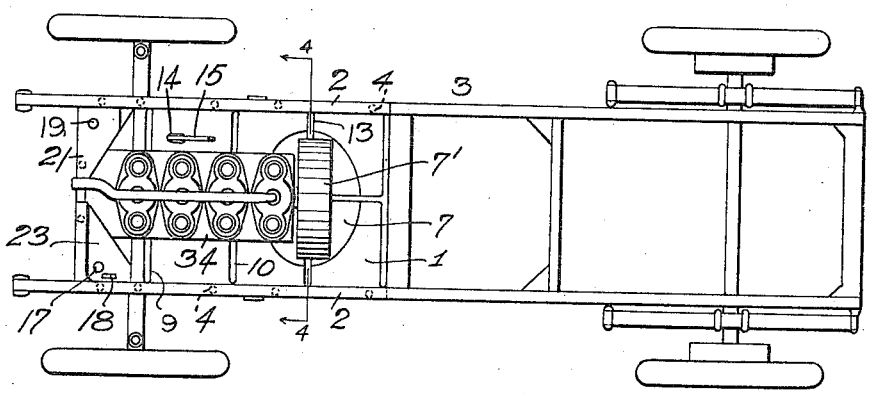
Figure 2:
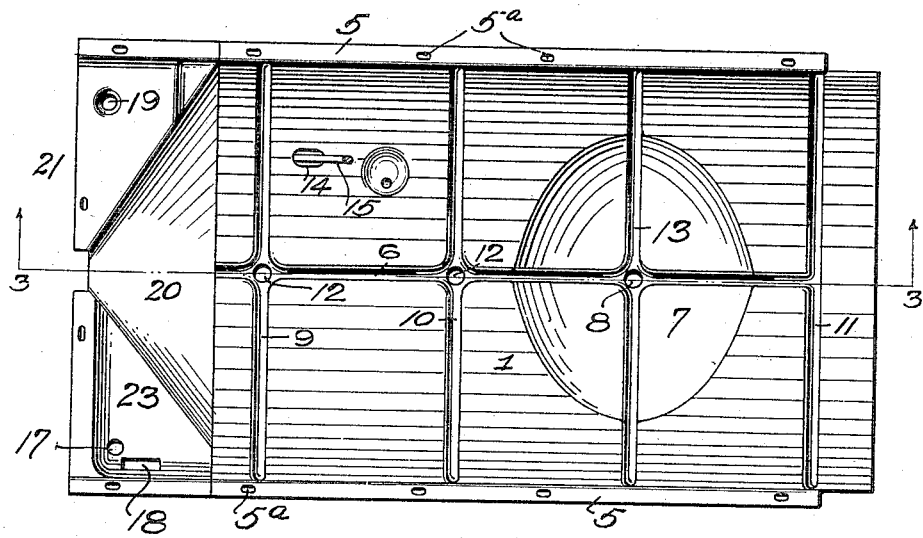
Figure 3:
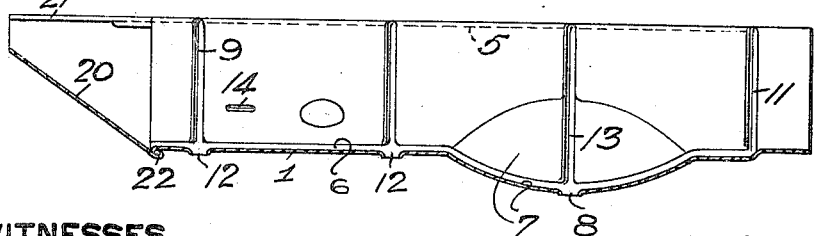
Figure 4:
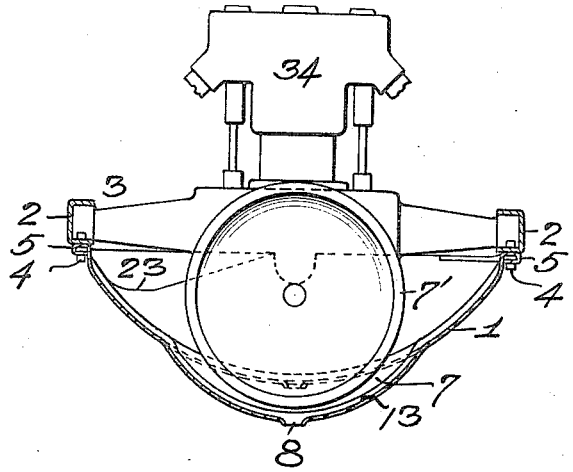
Figure 5:
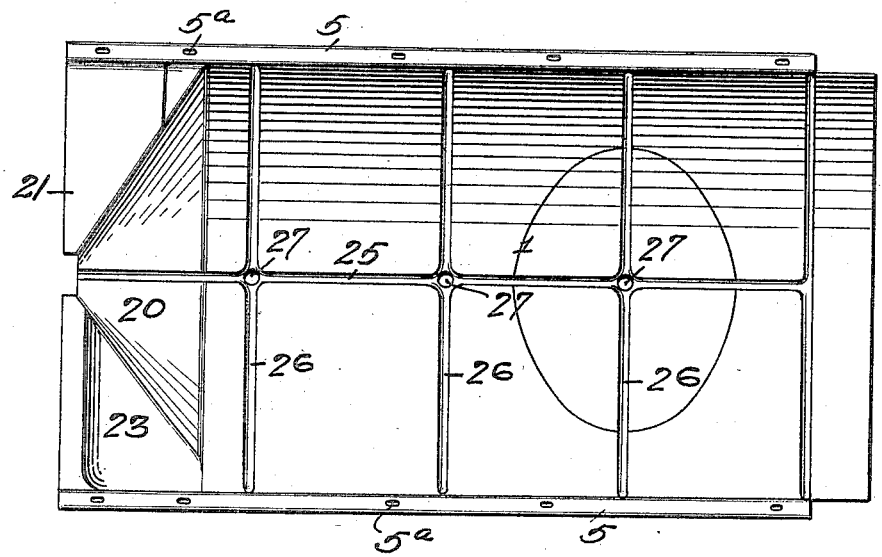

In the drawings Figure 1 is a diagrammatic view of an automobile chassis showing the dust pan of my invention applied thereto; Fig. 2 is a plan view of a preferred form of my invention; Fig. 3 is a side view of the embodiment illustrated in Fig. 2; Fig. 4 is a cross section showing the pan in position; and Fig. 5 is a plan view showing another embodiment.

The dust pan 1 is preferably suspended from the side members 2 of the chassis 3 by the bolts 4 passing through the holes or slots 5ª in the flanges 5, as indicated in Figs. 1 and 3, but any usual mode of suspension may be employed when desired. The figures illustrate my dust pan as carried under the engine or motor, and the fly wheel of an automobile, and is intended to be employed with any form of automobile. The dust pan 1 is of general oblong and hollow concavo-convex shape. It is constructed advantageously, according to my invention, of pressed or stamped sheet metal. The said pan 1 has pressed or stamped therein a longitudinal troughed rib or gutter 6. It has also preferably the bell portion 7. This bell portion 7 is provided in this type of pan to accommodate the fly wheel 7' of the gasolene engine 34 of the particular automobile for which this embodiment of my invention is designed, and to enable a closer fitting of the dust pan as a whole to the machinery. At the base of the bell portion 7 is the hole 8 for the escape of the waste oil. The transverse troughed ribs or gutters 9, 10 and 11 run across the pan intersecting, in the embodiment of Fig. 2, the gutter 6, and being provided at such intersections with the waste holes 12 for the discharge of oil. The transverse gutter 13 extends to the bell portion 7 and is preferably carried down the same to further stiffen the pan, the gutter leading to the exit hole 8 at the bottom thereof. The opening or hole 14 in the pan is provided to admit the rod 15 of the particular type of steering gear of the automobile. Likewise the holes 17, 18 and 19, located in the hollow forward portion 20, are provided for the drain cocks from the radiator, pumps, etc. These parts, however, may be varied or modified at will to suit varying automobiles and do not form directly any part of my invention.

In Figs. 2 and 3 I have illustrated the front apron portion 21 of the pan, as formed of a separate piece from the body thereof, said apron 21 being connected by a double lap-joint 22 to the body of the pan. This apron has the flat portions 23 adapted to contact with the lower face of the chassis and through which the drip holes 17, 18 and 19 extend. Such apron may be thus secured to the body after the stamping of the body or, as illustrated in Fig. 5, the apron portion may be formed integral with the pan, being stamped from the same body of sheet metal. Fig. 5 shows also the pan provided with the central longitudinal gutter 25 and several transverse gutters 26 with drip holes 27 at their meeting points, the pan having preferably the bell portion 28 for the flywheel. The several longitudinal and transverse gutters so formed in the hollow pressed drip pan act to materially stiffen the pan, both transversely and longitudinally so that I am enabled to obtain in a single piece a dust pan of much greater rigidity of form than in the automobile dust pans now in use and the pan will hold to shape and be practically free from vibration or rattling when in use, so overcoming a serious objection to the ordinary dust pans. In addition to this it provides, by means of the several gutters, means for the collection of the waste oil and grease, carrying the same down to the points of discharge and providing in this way a much more cleanly dust pan. The bell portion for the reception of the fly wheel also acts to stiffen the pan and makes it possible to have the pan conform more closely to the other portions of the driving parts, therefore leaving a greater space under the chassis of the machine. I thus produce a durable dust pan, light in weight and having a suitably stiffened body practically free from vibration and adapted to collect and carry off the waste oils and grease so that it requires less cleaning when removed from the machine.

It will be understood that the exact shape of the pan and the arrangement of the depressed gutters may be varied to suit the different automobile frames to which the pan is to be applied.

What I claim is:

1. An automobile dust pan provided with a longitudinal trough rib, and one or more transverse trough ribs intersecting therewith.

2. A pressed metal automobile dust pan of hollow form provided with a longitudinal gutter stamped therein, one or more transverse gutters crossing said gutter, and means for the emission of oil from said gutter.

3. A pressed sheet metal dust pan for automobiles having a curved trough shaped body provided with depressed gutters extending transversely and longitudinally of the pan serving to stiffen and brace the pan and prevent vibration, and forming gutters to collect the waste oil, and being provided with drip holes at the meeting points of the gutters.

4. An integral pressed metal automobile dust pan provided with a longitudinal depressed rib and a plurality of transverse depressed ribs, and with dripping means coöperating with said ribs for effecting the exit of waste oil.

5. A pressed metal automobile dust pan of hollow form provided with a depressed bell portion to receive the fly wheel.

6. A pressed metal automobile dust pan provided with a depressed bell portion to receive the fly wheel, and having a transverse gutter in line with and extending down into said depressed bell portion.

7. A pressed metal automobile dust pan of hollow form provided with a depressed bell portion and with transversely and longitudinally extending gutters entering into said depressed bell portion.

8. A pressed metal automobile dust pan of hollow form provided with a depressed gutter extending longitudinally of the pan and having an integral apron portion at the forward end adapted to extend up to and fit against the body of the automobile.

In testimony whereof, I the said WILLIAM H. MULLINS have hereunto set my hand.

WILLIAM H. MULLINS.

Witnesses:
ANNA B. HARNAR,
RALPH W. CAMPBELL.